(12) United States Patent  
Mann et al.

(10) Patent No.: US 11,701,990 B1
(45) Date of Patent: Jul. 18, 2023

(54) CONVERTIBLE WORKSTATION AND DINETTE

(71) Applicant: Winnebago Industries, Inc., Eden Prairie, MN (US)

(72) Inventors: Kimberly Mann, Minneapolis, MN (US); Eric Michael Jones, Mason City, IA (US); Matthew Haugen, Mason City, IA (US)

(73) Assignee: Winnebago Industries, Inc., Eden Prairie, MN (US)

( * ) Notice: Subject to any disclaimer, the term of this patent is extended or adjusted under 35 U.S.C. 154(b) by 0 days.

(21) Appl. No.: 17/694,772

(22) Filed: Mar. 15, 2022

Related U.S. Application Data (60) Provisional application No. 63/301,550, filed on Jan. 21, 2022.

(51) Int. Cl.
 *B60N 3/00* (2006.01)
 *A47B 83/04* (2006.01)

(52) U.S. Cl.
 CPC ............ *B60N 3/001* (2013.01); *A47B 83/045* (2013.01)

(58) Field of Classification Search
 CPC ......... A47B 1/04; A47B 17/06; A47B 17/065; A47B 5/04; A47B 83/045; B60N 3/001
 See application file for complete search history.

(56) References Cited

U.S. PATENT DOCUMENTS

| | | | |
|---|---|---|---|
| 1,051,793 A | 1/1913 | Whitaker | |
| 1,385,233 A | 7/1921 | Stafford | |
| 1,442,464 A | 1/1923 | Braun | |
| 4,592,603 A | 6/1986 | Adams et al. | |
| 5,088,135 A | 2/1992 | Violette | |
| D373,688 S | 9/1996 | Tulli | |
| 5,632,540 A * | 5/1997 | Wilcox | A47B 17/065 312/317.3 |
| 6,224,516 B1 | 5/2001 | Disch | |
| 9,872,573 B1 | 1/2018 | Yates et al. | |
| 10,059,241 B2 | 8/2018 | Jergenson | |
| 2005/0104489 A1* | 5/2005 | Ortiz | A47B 17/03 312/282 |
| 2006/0016372 A1 | 1/2006 | Younse | |
| 2006/0273606 A1* | 12/2006 | Rasmussen | B60P 3/34 296/26.13 |
| 2013/0284075 A1* | 10/2013 | Reithler | A47B 17/065 108/91 |
| 2015/0013572 A1* | 1/2015 | Hillman | B60N 3/001 108/44 |
| 2021/0076791 A1* | 3/2021 | DeVeaux | A47B 13/081 |

FOREIGN PATENT DOCUMENTS

DE 20211666 U1 * 9/2002 ........... A47B 17/065

OTHER PUBLICATIONS

DE20211666 Translation (Year: 2023).*

* cited by examiner

*Primary Examiner* — Matthew W Ing
(74) *Attorney, Agent, or Firm* — Faegre Drinker Biddle & Reath LLP (57) ABSTRACT

A dinette assembly includes a cabinet assembly with a workstation desk top that can converted between a compact position and an extended position. The dinette assembly also includes a table assembly with features that allow the table assembly to rotate, expand, and/or slide to allow the dinette assembly to be converted into different arrangements.

20 Claims, 12 Drawing Sheets

CONVERTIBLE WORKSTATION AND DINETTE

CROSS-REFERENCE TO RELATED APPLICATION

This application claims priority to U.S. Provisional Application No. 63/301,550, filed Jan. 21, 2022, which is herein incorporated by reference in its entirety.

SUMMARY

In certain embodiments, a dinette assembly includes a cabinet assembly with a workstation desk top that can converted between a compact position and an extended position. The dinette assembly also includes a table assembly with features that allow the table assembly to rotate, expand, and/or slide to allow the dinette assembly to be converted into different arrangements.

In certain embodiments, an assembly includes a cabinet assembly having an outer frame and a table assembly. The table assembly is configured to (1) rotate within a plane between a first position and a second position and (2) slide along the cabinet assembly within the plane while the table assembly is in the second position.

In certain embodiments, a recreational vehicle includes a dinette assembly with a cabinet assembly and a table assembly. The dinette assembly can be positioned on a slideout. The cabinet assembly has an outer frame. The table assembly is configured to rotate within a plane between a first position and a second position as well as slide along the cabinet assembly within the first plane while the table assembly is in the second position.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Figure 1:
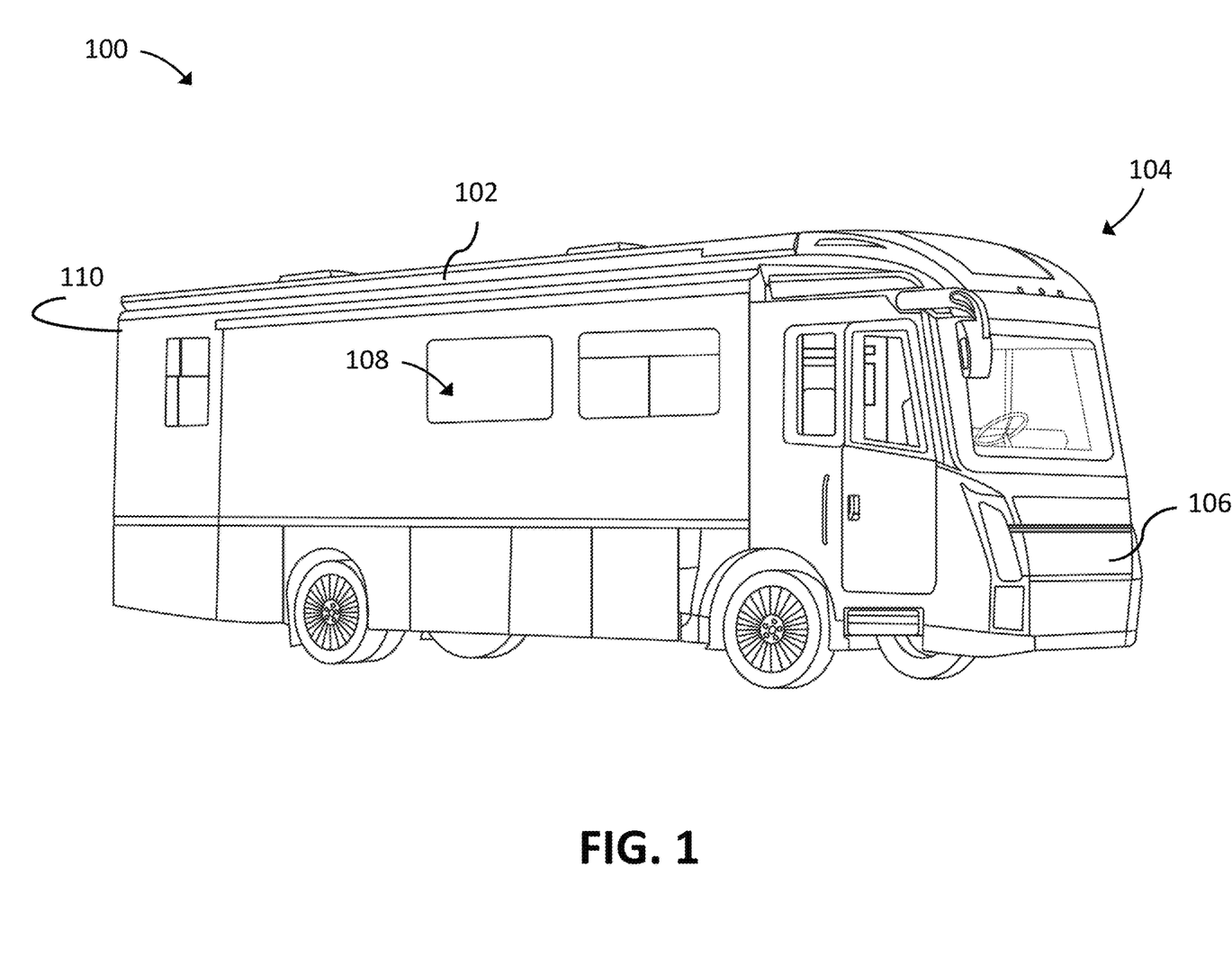
FIG. 1 shows a recreational vehicle, in accordance with certain embodiments of the present disclosure.

FIG. 1 shows a recreational vehicle 100 having a body 102 that houses a cab area 104 at a front end 106 of the recreational vehicle 100 and a living space area 108 positioned between the cab area 104 and a rear end 110 of the recreational vehicle 100. Although FIG. 1 shows what is typically referred to as a Class A recreational vehicle, embodiments of the present disclosure can be used in other types of motorized recreational vehicles (e.g., Class B recreational vehicles, Class C recreational vehicles, and the like) and non-motorized types of recreational vehicles (e.g., $5^{th}$ wheel trailers, travel trailers, and the like).

Figure 2:
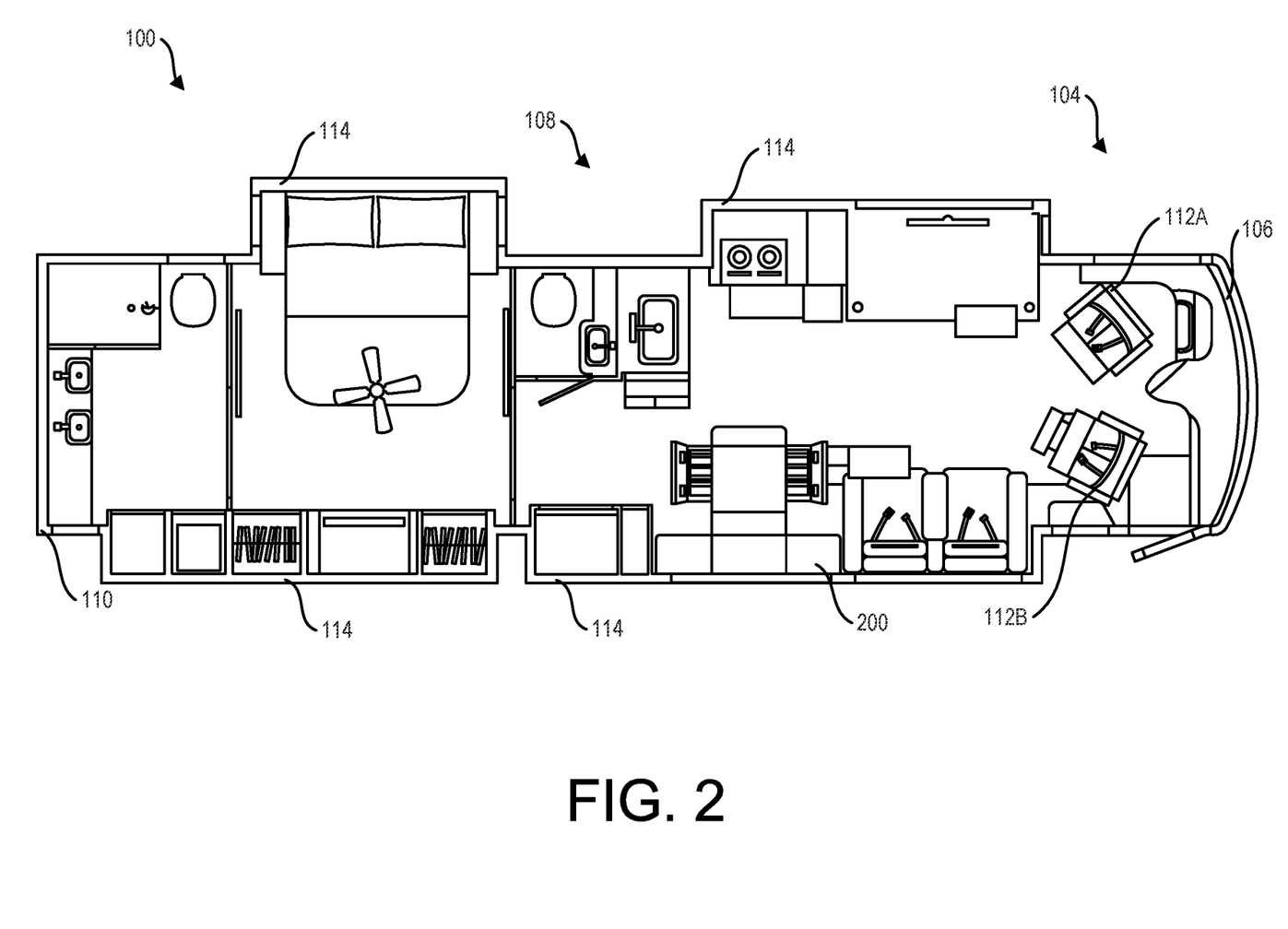
FIG. 2 shows a floor plan of the recreational vehicle of FIG. 1, in accordance with certain embodiments of the present disclosure.

FIG. 2 shows a top-down view of a floorplan of the recreational vehicle 100. The floorplan is just one example of how embodiments of the present disclosure can be used with recreational vehicles such as the recreational vehicle 100.

As shown in FIG. 2, the recreational vehicle 100 can include a driver's seat 112A and a passenger seat 112B located in the cab area 104. The driver's seat 112A and the passenger seat 112B can rotate to face various directions (e.g., forward when driving, aft when parked, and therebetween).

The recreational vehicle 100 includes multiple slideouts 114 which can extend and retract. When the recreational vehicle 100 is parked (as shown in FIG. 2), the slideouts 114 can be extended to increase the area of the floorplan. As such, users have more space within the living space area 108. As shown in FIG. 2, the slideouts 114 can support various pieces of furniture. One example is a convertible workstation and dinette assembly 200, which is discussed in more detail below. Although the convertible workstation and dinette assembly 200 is shown as being positioned on one of the slideouts 114, the assembly 200 can be positioned elsewhere within the recreational vehicle 100. Further, the convertible workstation and dinette assembly 200 can be used in applications other than recreational vehicles.

Figure 3:
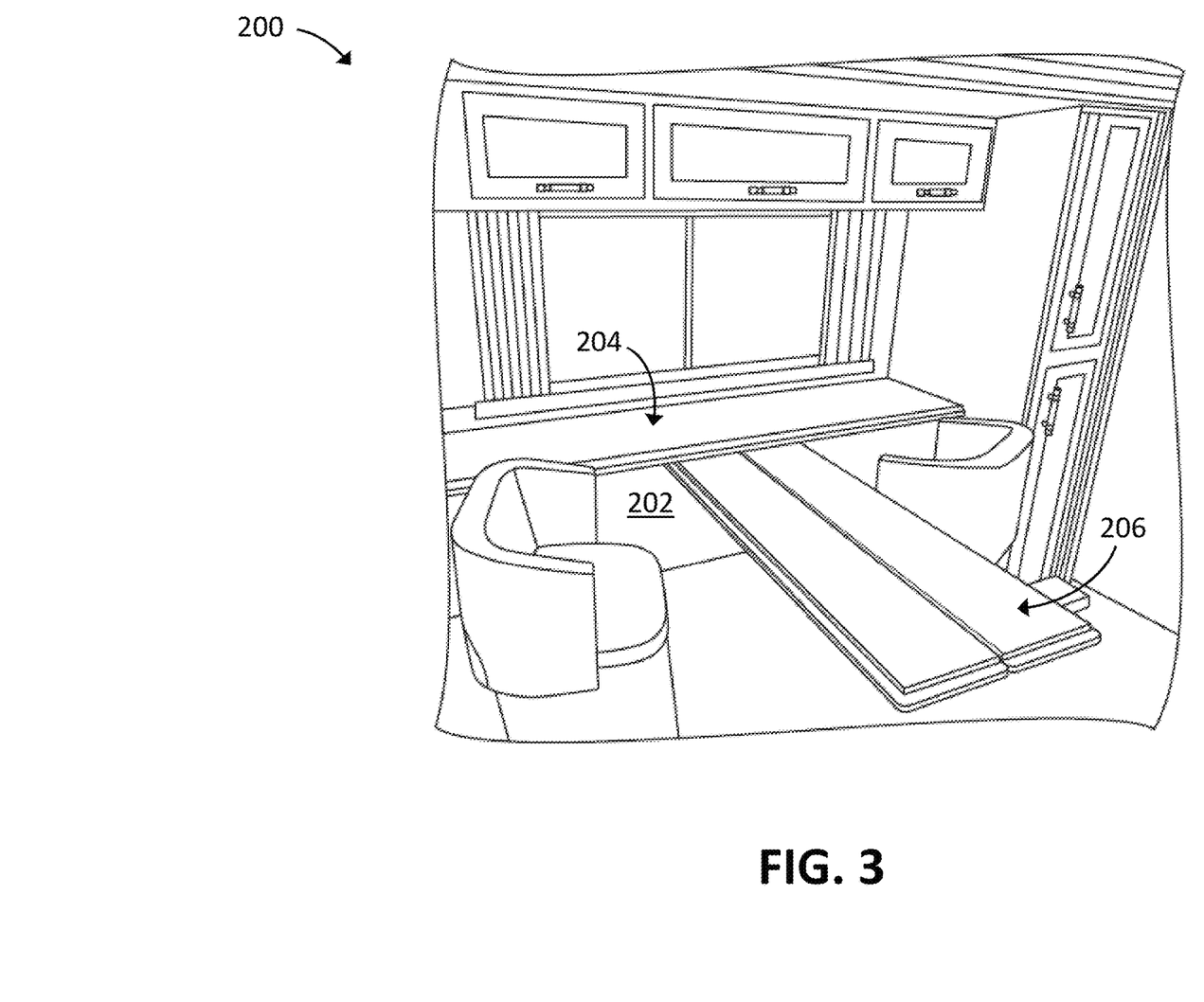
FIG. 3 shows a perspective view of a convertible workstation and dinette assembly positioned within the recreational vehicle of FIG. 1, in accordance with certain embodiments of the present disclosure.

FIG. 3 shows the convertible workstation and dinette assembly 200 (hereinafter referred to as "the dinette assembly 200" for brevity) as viewed from the interior of the recreational vehicle 100. As will be described in more detail below, the dinette assembly 200 can be converted into several different arrangements.

The dinette assembly 200 includes a cabinet assembly 202, which includes a work surface assembly 204 that is convertible such that it can be moved between a compact position and an extended position. The dinette assembly 200 also includes a table assembly 206 with features that can rotate, expand, and/or slide to allow the dinette assembly 200 to be converted into different arrangements.

Figure 4:
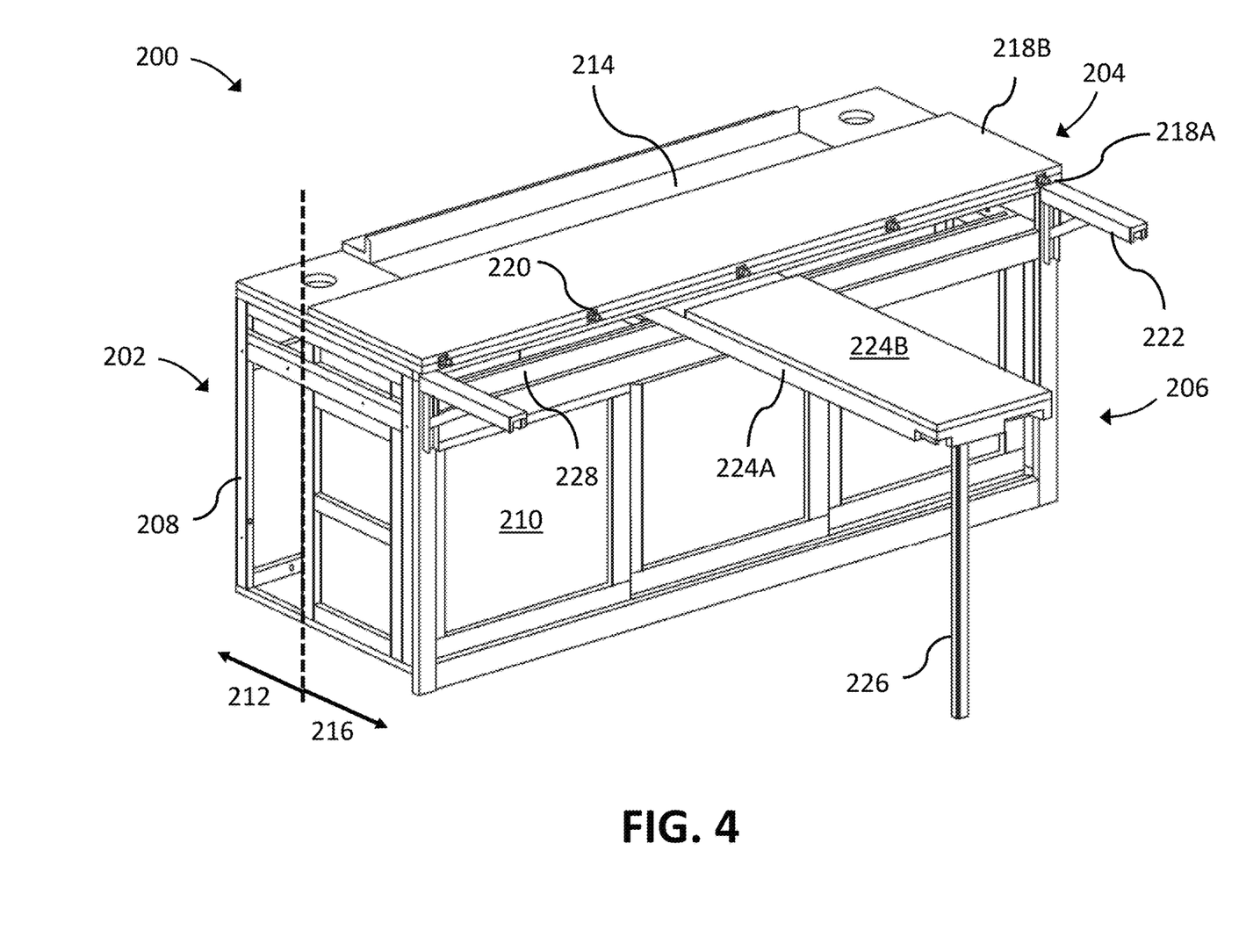
FIG. 4 shows a perspective view of a front of a frame for the convertible workstation and dinette assembly of FIG. 3, in accordance with certain embodiments of the present disclosure.

FIG. 4 shows a perspective view of a front of the dinette assembly 200. The cabinet assembly 202 includes an outer frame 208 with frame members that, together, define an outer envelope of the cabinet assembly 202. Various panels 210 can be coupled to the outer frame 208 to cover the outer frame 208 and the interior of the cabinet assembly 202. For example, the panels 210 can have a finished surface (e.g., painted surface, stained surface) to create a visually-appealing exterior. Some or all of the panels 210 can be movable (e.g., slidable, rotatable) and/or removable from the outer frame 208 such that the interior space (e.g., volume within the outer envelope) can be accessed. For example, the panels 210 can be slid or rotated to open and expose the interior space of the cabinet assembly 202. The panels 210 can be latched otherwise locked when closed.

The cabinet assembly 202 can include a back section 212 at the rear of the cabinet assembly 202. In the example of FIG. 4, the back section 212 houses a display lift assembly. The display lift assembly can include a display such as a television screen which can be raised and lowered. When not in use, the display can be positioned or housed within the outer frame 208 of the cabinet assembly 202, and the display lift assembly (e.g., via a support structure coupled to a motorized lift) can raise the display out of the outer frame 208 such that a user can view the display. To allow the display to move into and out of the outer frame 208, the cabinet assembly 202 can include a door 214 that can open and close. In the open position, the door 214 creates an opening that the display can pass through. In the closed position, the door 214 covers the opening and can be used as a working surface. In FIG. 4, the door 214 is shown in the closed position.

The cabinet assembly 202 can include a front section 216. The front section 216 includes at least part of the outer frame 208 that supports the work surface assembly 204. The work surface assembly 204 includes a first desk top 218A and a second desk top 218B. The first desk top 218A and the second desk top 218B are rotatable coupled to each other (e.g., via one or more hinges 220). In embodiments, the first desk top 218A is stationary while the second desk top 218B is rotatable with respect to the stationary first desk top 218A. In certain embodiments, the first desk top 218A and the second desk top 218B are approximately the same size (e.g., the same length, width, and thickness).

The work surface assembly 204 can be converted between a compact position and an extended position. In FIG. 4, the work surface assembly 204 is shown in the compact position where the second desk top 218B rests upon (or is supported by) the first desk top 218A. In the extended position, the second desk top 218B is rotated ~180 degrees to increase the amount of useable surface area of the work-surface portion of the dinette assembly 200. The cabinet assembly 202 can include one or more supports 222 on which the second desk top 218B rests upon in the extended position. The supports 222 can be moved (e.g., rotated, slid, unlocked) between a stored position (when not in use) and a support position (as shown in FIG. 4) as needed.

As noted above, the dinette assembly 200 also includes the table assembly 206 with features that can rotate, expand, and/or slide to allow the dinette assembly 200 to be converted into different arrangements. As will be described in more detail below, the table assembly 206 is able to rotate out of and into the cabinet assembly 202 between a stored position and a use position as well as slide along the cabinet assembly 202 while the table assembly is in the use position.

FIG. 4 shows one arrangement of the table assembly 206. In this arrangement, the table assembly 206 is positioned in the use position. The table assembly 206 includes a first table section 224A and a second table section 224B. The first table section 224A and the second table section 224B are rotatable coupled to each other (e.g., via one or more hinges). When the table assembly 206 is stationary, the first table section 224A is also stationary while the second table section 224B is rotatable with respect to the stationary first table section 224A between two positions. In one position (e.g., a compact position or closed position), the second table section 224B rests on (or is supported by) the first table section 224A. This arrangement is shown in FIG. 4. In the other position (e.g., an extended position or open position), the second table section 224B is rotated ~180 degrees to increase the amount of useable surface area of the dining-surface portion of the dinette assembly 200.

The table assembly 206 can include a leg 226 that is movable between a support position (as shown in FIG. 4) and a storage position. In the support position, the leg 226 extends between a bottom of the table assembly 206 and a floor of the recreational vehicle. One end of the leg 226 can be rotatable coupled to the table assembly 206 (e.g., at or near a distal end of the table assembly 206) such that the leg 226 can provide structural support for the table assembly 206 when it is in the use position. In other embodiments, the table assembly 206 does not include the leg 226 and is cantilevered in the use position.

As shown in FIG. 4, part of the table assembly 206 extends through an opening 228 of the cabinet assembly 202. The opening 228 extends between opposing sides of the cabinet assembly 202 so that the table assembly 206 can be moved from side to side, as will be described in more detail below. In addition to allowing the table assembly 206 to move side to side, the opening 228 is large enough for the table assembly 206 to be rotated such that the table assembly 206 is completely positioned within the cabinet assembly 202 (e.g., within the outer envelope of the cabinet assembly 202). As such, the table assembly 206 can be rotated between a use position (as shown in FIG. 4) and a stored position where the table assembly 206 is positioned entirely within the cabinet assembly 202 and hidden from view. When the table assembly 206 is in its stored position, the opening 228 can be covered by a panel. For example, the panel could be coupled to one or more hinges and include a handle or knob so that a user can open and close the panel to expose or cover the opening 228 (and therefore the table assembly 206 when stored). In embodiments, the one or more hinges are coupled at a bottom portion of the panel so that, when the panel is opened, the table assembly 206 can be rotated over the opened panel.

Figure 5:
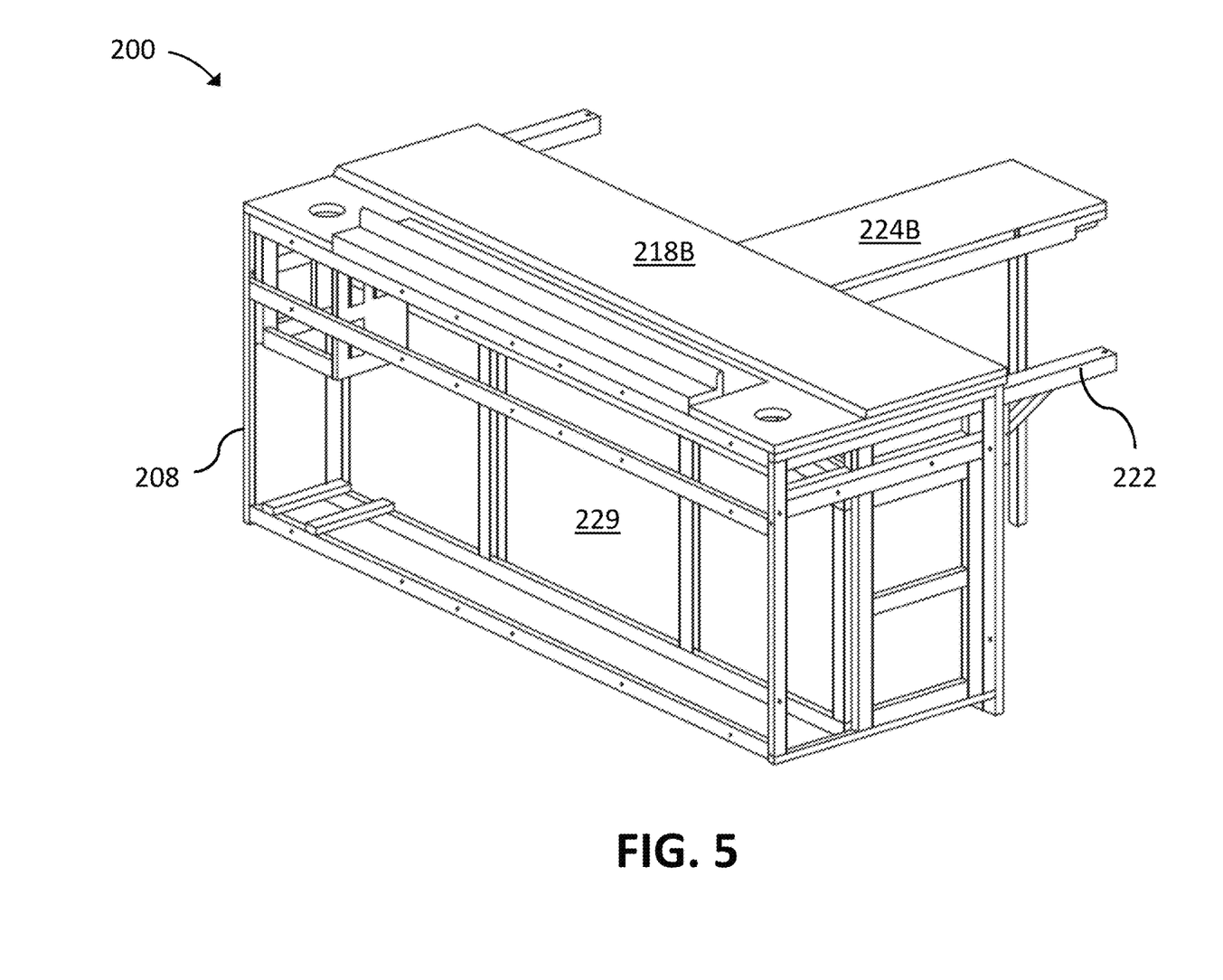
FIG. 5 shows a perspective view of a back of the frame for the convertible workstation and dinette assembly of FIG. 3, in accordance with certain embodiments of the present disclosure.

FIG. 5 shows a rear view of the dinette assembly 200. In certain embodiments, the dinette assembly 200 includes a wall 229 or panel that separates the interior spaces of the back section 212 and the front section 216. In embodiments, the dinette assembly 200 does not include the back section 212 to reduce the overall depth of the dinette assembly 200.

Figure 6:
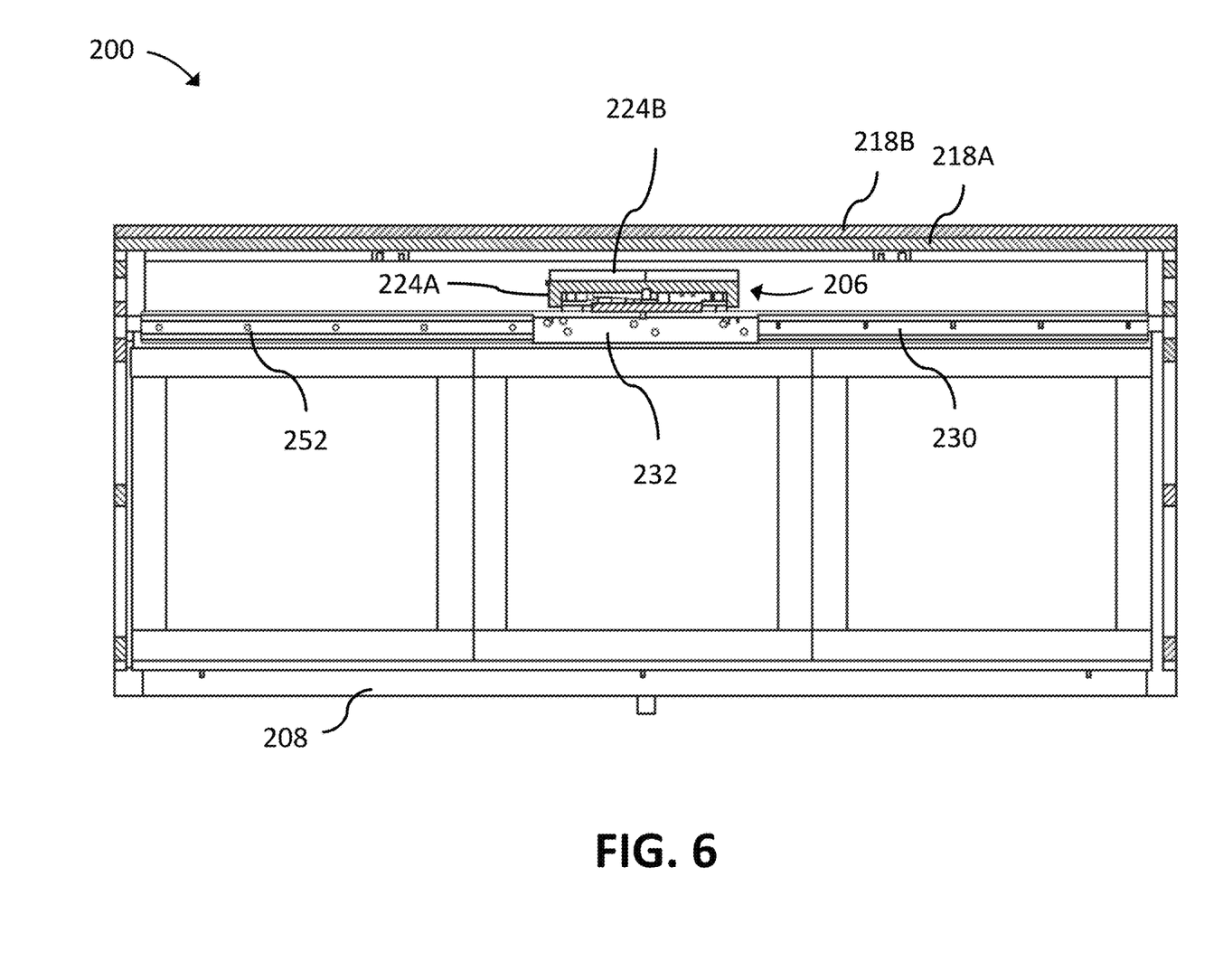
FIG. 6 shows a back view of the frame for the convertible workstation and dinette assembly of FIG. 3, in accordance with certain embodiments of the present disclosure.

FIG. 6 shows a section view of the dinette assembly 200. The dinette assembly 200 includes a rail assembly 230 to which the table assembly 206 is slidably coupled to. The rail assembly 230 extends between two opposing sides of the cabinet assembly 202. The rail assembly 230 allows the table assembly 206 to slide from side to side within the cabinet assembly 202. As will be described in more detail below, the table assembly 206 and the rail assembly 230 can include one or more features such as railings, slides, bearings, wheels, and the like to allow the table assembly 206 to slide relative to the stationary rail assembly 230.

FIG. 6 shows the first table section 224A and the second table section 224B being supported by a support structure 232. The support structure 232 can be considered part of the table assembly 206 and is slidably coupled to the rail assembly 230.

Figure 7:
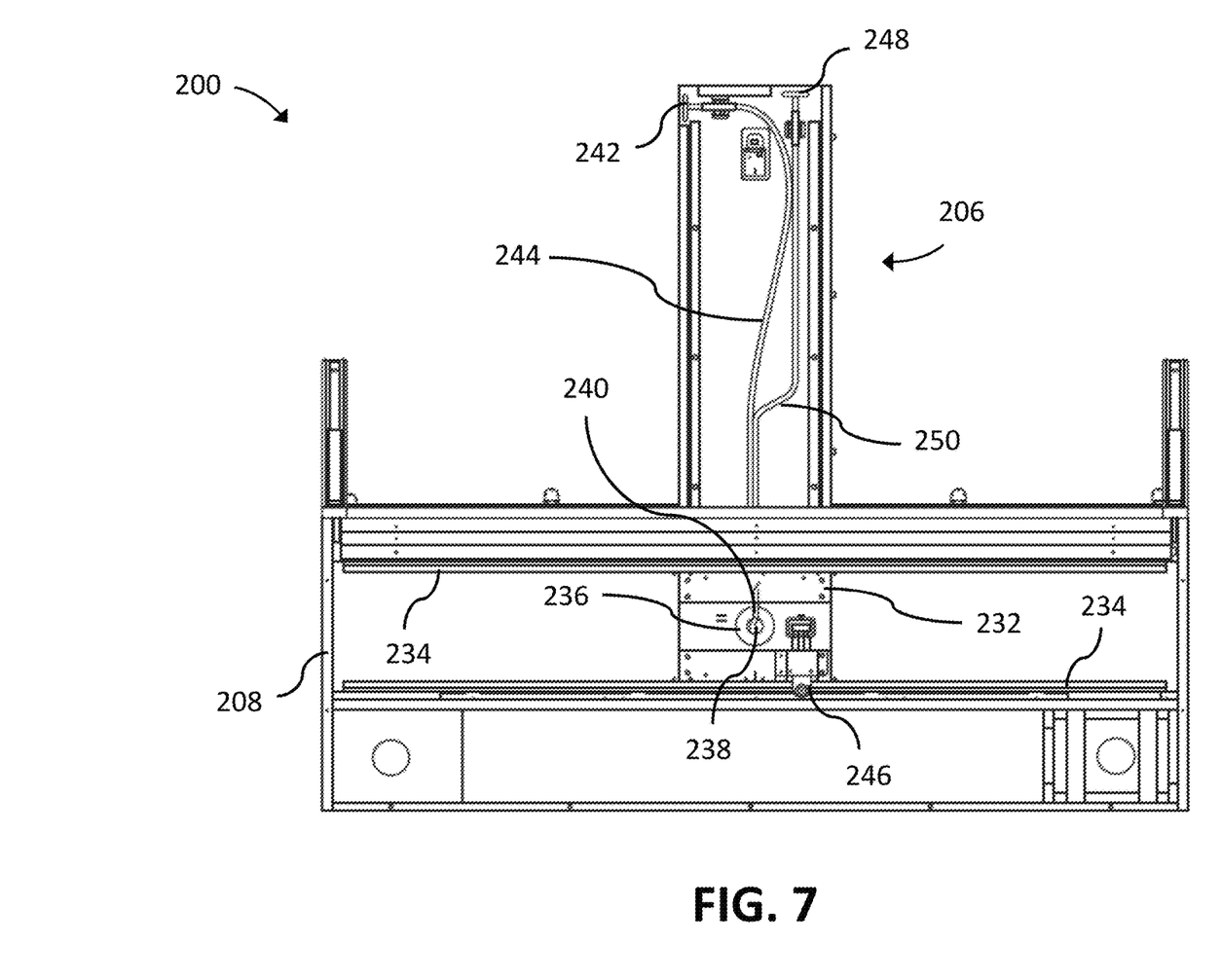
FIG. 7 shows a bottom view of the frame for the convertible workstation and dinette assembly of FIG. 3, in accordance with certain embodiments of the present disclosure.

The support structure 232 is shown in more detail in FIG. 7, which shows a bottom view of the dinette assembly 200. The support structure 232 extends between two rails 234, which are part of the rail assembly 230. The rails 234 are coupled to one or more members of the outer frame 208.

The support structure 232 is coupled to or includes a pivot assembly 236. The pivot assembly 236 can include one or more features such as bearings and the like to allow part of the table assembly 206 (e.g., the first table section 224A and the second table section 224B) to be rotated around a pivot point 238. As such, the table assembly 206 can both rotate around the pivot point 238 (e.g., to rotate out of and into the cabinet assembly 202) but also slide along the rail assembly 230.

The table assembly 206 can include various features to help lock parts of the table assembly 206 into place.

As one example, the table assembly 206 includes a first latch 240 (e.g., a pin) that can be engaged or disengaged at the pivot assembly 236 to allow the first table section 224A and the second table section 224B to be rotated or to lock those sections in place. The first latch 240 can be operably coupled to a first handle 242 accessible at the distal end of the table assembly 206. The first latch 240 can be positioned such that the first latch 240 can be accessed (e.g., via the opening in the cabinet assembly) when the table assembly 206 is in its stored position. The first handle 242 can be coupled to a first cable 244 that is connected to the first latch 240 such that the first handle 242 can be pulled by a user to disengage the first latch 240 or released by a user to engage the first latch 240.

As another example, the table assembly 206 includes a second latch 246 that can be engaged or disengaged at the rail assembly 230 to allow the first table section 224A and the second table section 224B to be slid or to lock those sections in place. The second latch 246 can be operably coupled to a second handle 248 accessible at the distal end of the table assembly 206. The second handle 248 can be coupled to a second cable 250 that is connected to the second latch 246 such that the second handle 248 can be pulled by a user to disengage the second latch 246 or released by a user to engage the second latch 246. In certain embodiments, the second handle 248 is arranged and designed to be pullable in a direction that is perpendicular to the direction the first handle 242 is pulled to engage/disengage the first latch 240.

In certain embodiments, at least one of the rails 234 (as shown in FIG. 6) includes various openings 252 in which the second latch 246 can engage and disengage to lock or unlock the table assembly 206 into place.

FIGS. 8-16 show simplified schematics of the dinette assembly 200 to show various ways the dinette assembly 200 can be arranged. The schematics each show top-down views of the dinette assembly 200.

Figures 8, 9:
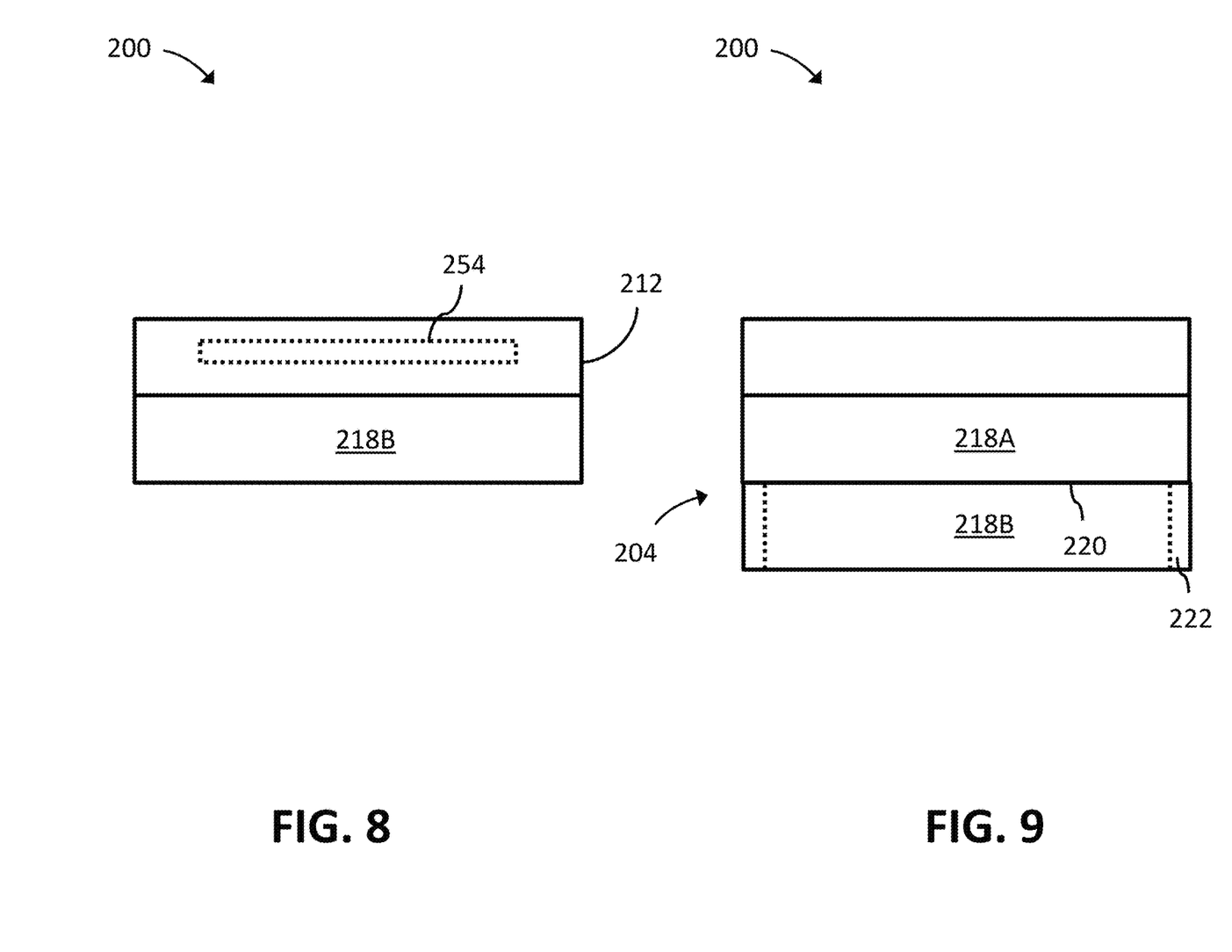
FIGS. 8-16 show schematics of various configurations of the convertible workstation and dinette assembly of FIG. 3, in accordance with certain embodiments of the present disclosure.

FIG. 8 shows the dinette assembly 200 with its various assemblies positioned in a stored or compact position. For example, the second desk top 218B of the work surface assembly 204 is positioned such that it is supported by the first desk top 218A (as shown in FIG. 4). Further, the display lift assembly 254 is retracted and positioned within the back section 212 of the cabinet assembly 202. For clarity, the display lift assembly 254 is not shown in the remaining figures.

FIG. 9 shows the dinette assembly 200 with the work surface assembly 204 in the extended position. In this position, the second desk top 218B is rotated with respect to the first desk top 218A such that the useable surface area is increased compared to the arrangement shown in FIG. 8. The first desk top 218A and the second desk top 218B are coupled together by the one or more hinges 220. The second desk top 218B can be supported by supports 222 (shown in dotted lines) beneath the second desk top 218B. For clarity, the supports 222 are not shown in the remaining figures.

Figure 10:
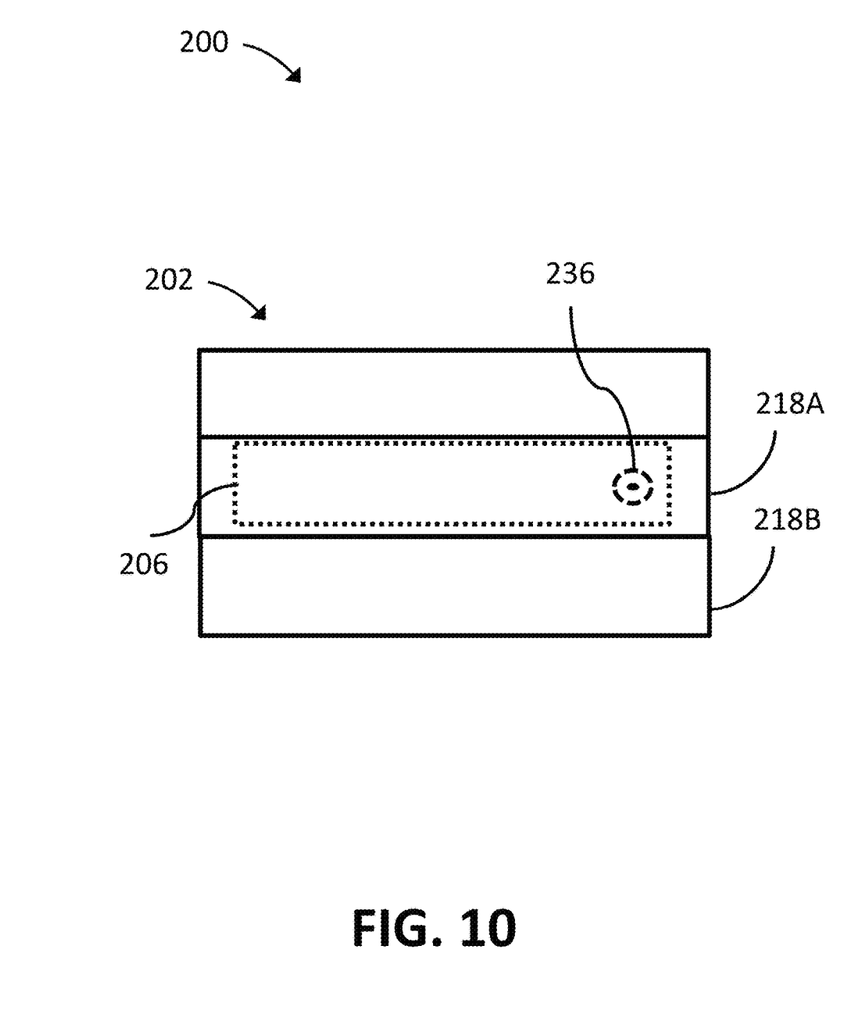

Like FIG. 9, FIG. 10 shows the dinette assembly 200 with the work surface assembly 204 in the extended position. However, in FIG. 10, the table assembly 206 (outlined by dotted lines) is shown in the stored position. In the stored position, the table assembly 206 is positioned within the cabinet assembly 202 (e.g., completely within the outer envelope of the cabinet assembly 202). The table assembly 206 includes or is coupled to the pivot assembly 236. A pivot point of the table assembly 206 is shown as being positioned in the middle of the pivot assembly 236. The pivot point represents the point at which an axis extends through, and the table assembly 206 pivots or rotates around that axis (and therefore around the pivot point).

Figure 11:
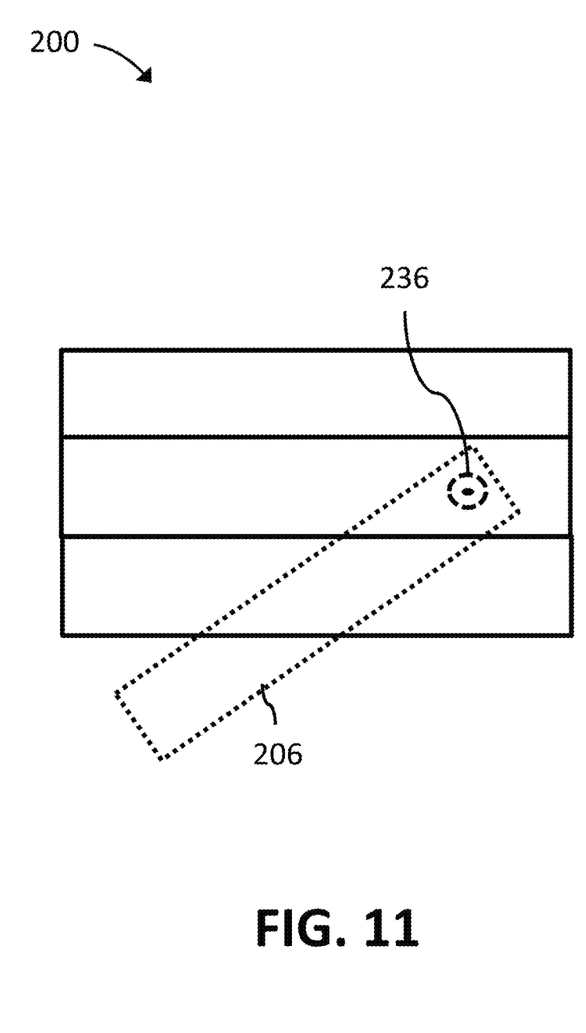

FIG. 11 shows the dinette assembly 200 with the table assembly 206 partially rotated between its stored position and use position. As shown, the table assembly 206 can be rotated around the pivot assembly 236.

Figure 12:
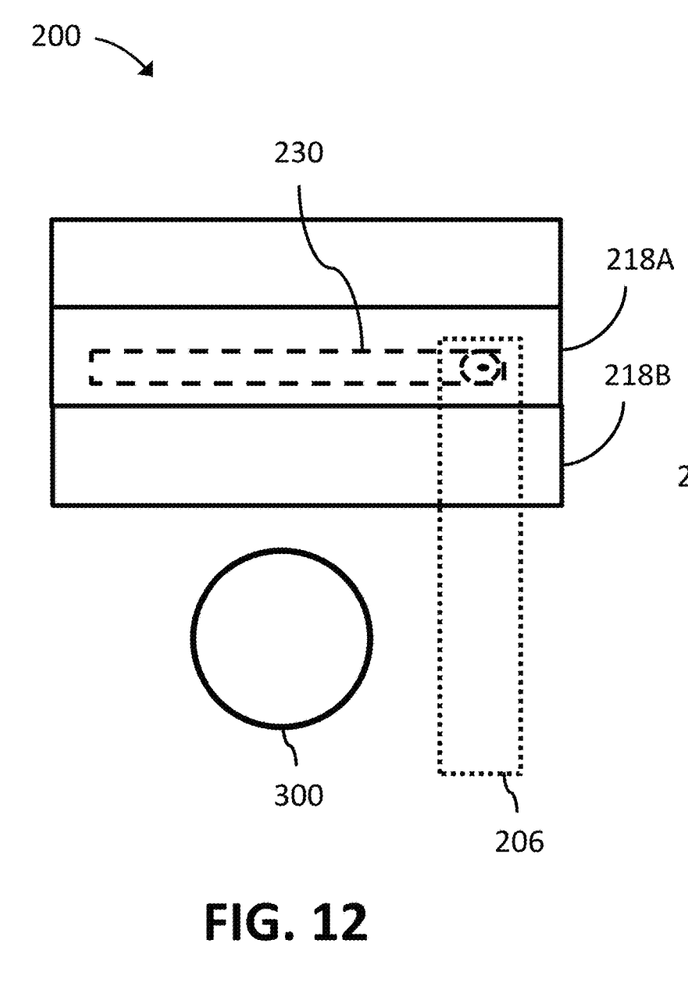

FIG. 12 shows the dinette assembly 200 with the table assembly 206 in its use position. In the use position, the table assembly 206 has an orientation that is perpendicular to its orientation when in the stored position. As shown, part of the table assembly 206 is partially positioned within the cabinet assembly 202 while the majority of the table assembly 206 is positioned outside the cabinet assembly 202. The table sections of the table assembly 206 are positioned in their compact position or closed position. In FIG. 12, the work surface assembly 204 remains in the extended position. The rail assembly 230 of the dinette assembly 200 is shown in dotted lines. In the arrangement of FIG. 12, a chair 300 can be positioned to allow a user to utilize the available surfaces of the work surface assembly 204 and the table assembly 206.

Figure 13:
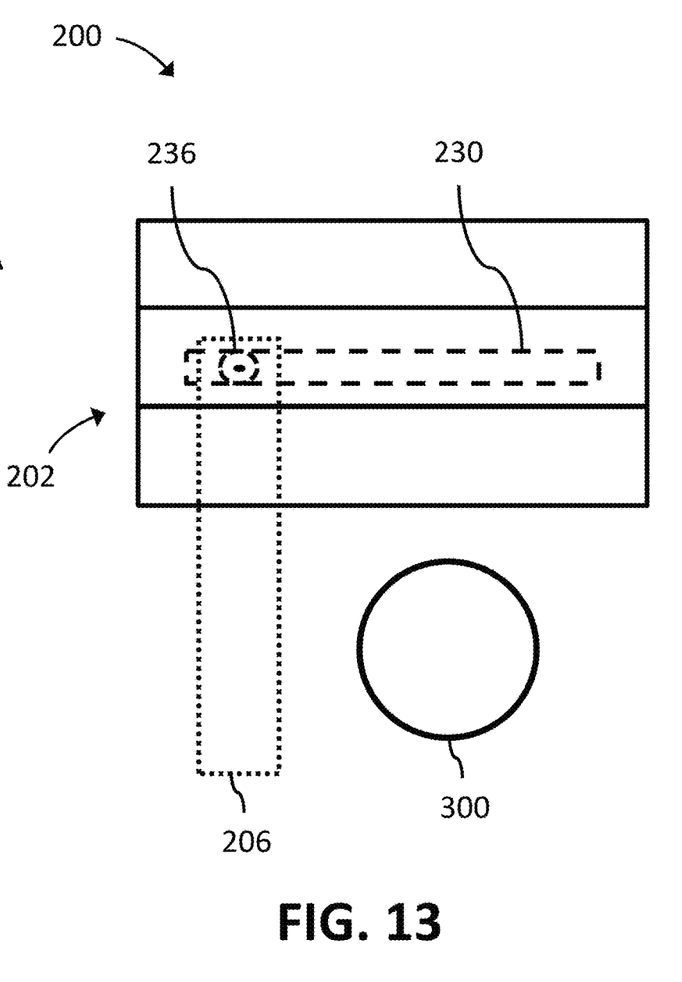

FIG. 13 shows the dinette assembly 200 in the same arrangement as shown in FIG. 12 except that the table assembly 206 has been moved to the opposite side of the cabinet assembly 202. As previously noted, the table assembly 206 is configured to both (1) rotate between the stored position and the use position via the pivot assembly 236 and (2) slide from side to side along the cabinet assembly 202 via the rail assembly 230 and the pivot assembly 236. In embodiments, the axis of rotation of the table assembly 206 intersects (e.g., at the pivot point) with the axis along which the table assembly 206 slides along. As such, the pivot point of the table assembly 206 can slide from side to side of the cabinet assembly 202.

Figure 14:
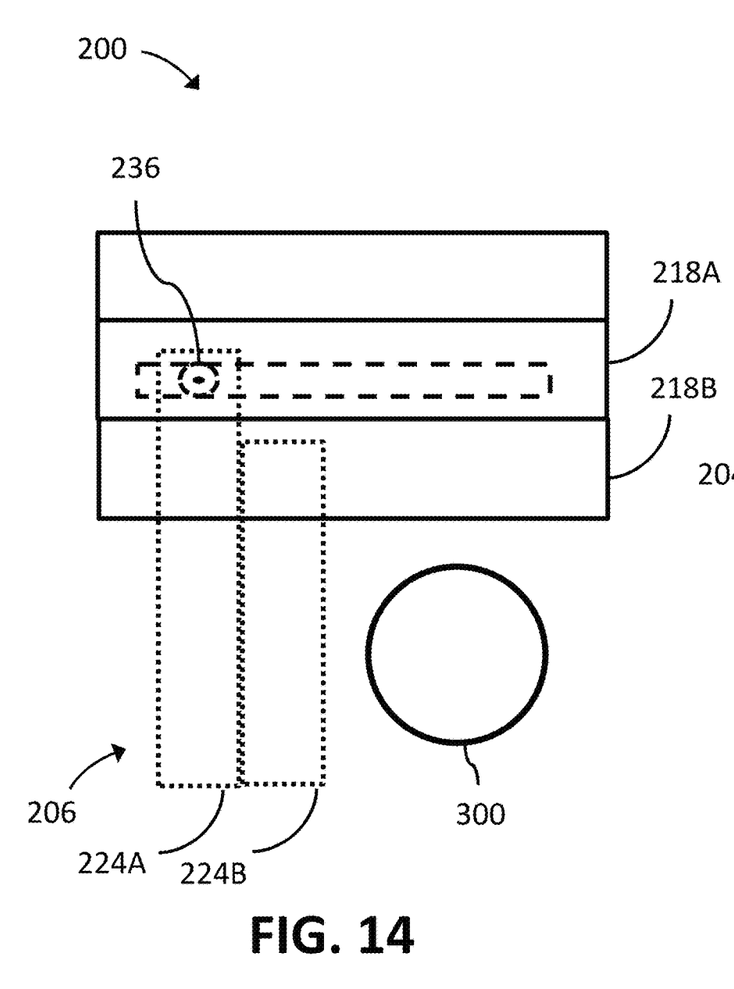

FIG. 14 shows the dinette assembly 200 in the same arrangement as shown in FIG. 13 except that the table assembly 206 is in its extended position. In this position, the second table section 224B has been rotated away from the first table section 224A such that there is more useable surface area. As shown in FIG. 14, the second table section 224B is shorter than the first table section 224A because the first table section 224B extends into the cabinet assembly 202 such that it is supported by the pivot assembly 236. When the table assembly 206 is in its use position, the second table section 224B is positioned outside of the cabinet assembly 202 so that the second table section 224B can be rotated between the compact position and the extended position (the position shown in FIG. 14). Although in FIG. 14 the work surface assembly 204 is shown in the extended position (such that the second desk top 218B is not resting on the first desk top 218A), the work surface assembly 204 may need to be moved to its compact position before the second table section 224B can be rotated to its extended position. In the arrangement of FIG. 14, both the work surface assembly 204 and the table assembly 206 are in their extended positions to maximize the useable surface area of the dinette assembly 200.

Figure 15:
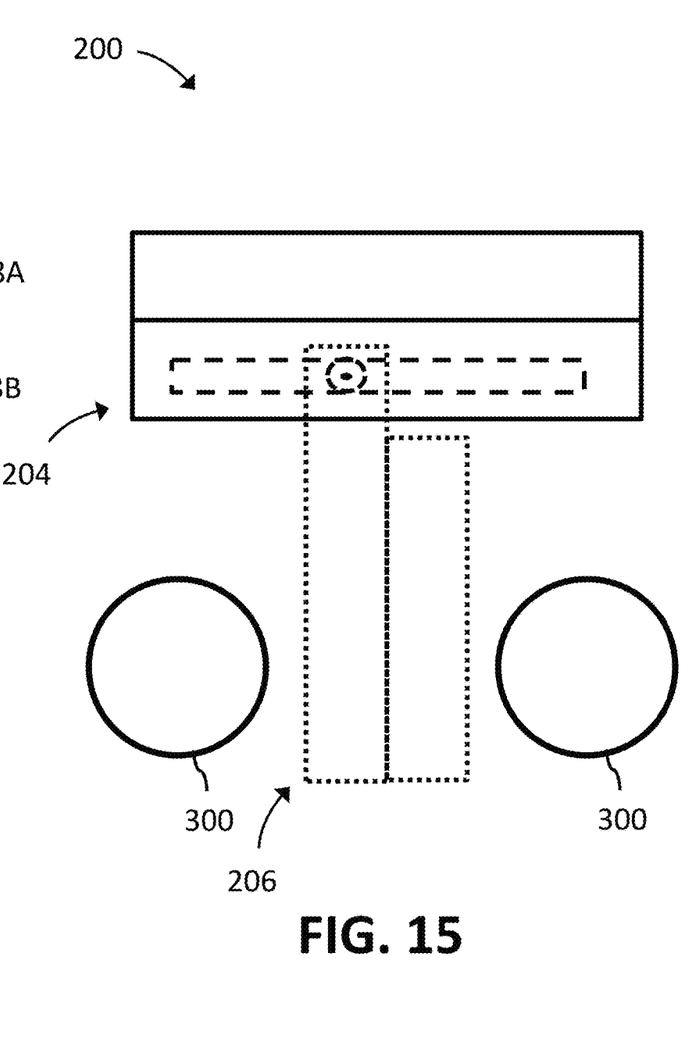

FIG. 15 shows the dinette assembly 200 in the same arrangement as shown in FIG. 14 except that (1) the table assembly 206 has been moved to the middle of the dinette assembly 200 and (2) the work surface assembly 204 has been moved to its compact position to maximize the useable surface area of the table assembly 206. Such an arrangement may be used so that chairs 300 can be positioned on both sides of the table assembly 206, which can be used during meals, for example.

Figure 16:
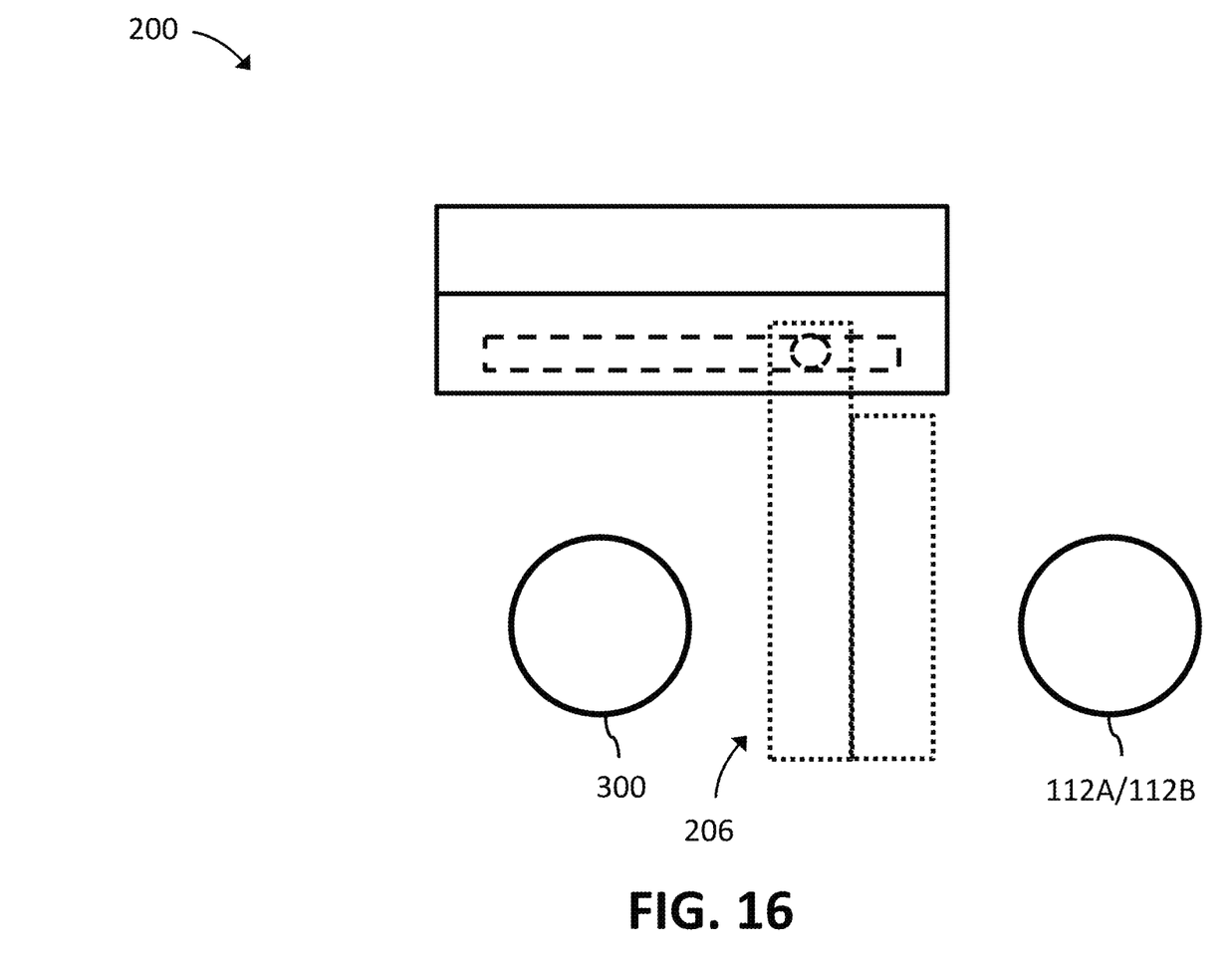

FIG. 16 shows the dinette assembly 200 in the same arrangement as shown in FIG. 15 except that the table assembly 206 has been moved from the middle of the dinette assembly 200 to one side. In this arrangement, depending on the position of the dinette assembly 200 within the recreational vehicle 100, the table assembly 206 can be moved to allow either the driver's seat 112A or the passenger seat 112B to be used for seating on side of the dinette assembly 200.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An assembly comprising:
 a cabinet assembly having an outer frame; and
 a table assembly configured to (1) rotate within a plane between a first position and a second position and (2) slide along the cabinet assembly within the plane while the table assembly is in the second position.

2. The assembly of claim 1, wherein the outer frame defining an outer envelope and wherein, in the first position, the table assembly is completely positioned within the outer envelope.

3. The assembly of claim 2, wherein, in the second position, the table assembly is partially positioned within the outer envelope and partially positioned outside the outer envelope.

4. The assembly of claim 1, wherein the table assembly is configured to rotate between the first position and the second position around a pivot point, wherein the pivot point is movable along the cabinet assembly between sides.

5. The assembly of claim 1, wherein, in the second position, the table assembly is configured to convert between a closed position and an open position, wherein the table assembly includes a first table section connected to a second table section via a hinge.

6. The assembly of claim 5, wherein the second table section is configured to rotate approximately 180 degrees between the closed position and the open position.

7. The assembly of claim 5, wherein the second table section is configured to rotate around the hinge between the closed position and the open position, wherein the first table section is stationary between the closed position and the open position.

8. The assembly of claim 1, wherein the table assembly is coupled to a first latch, which is configured to be engaged or disengaged to permit rotation of the table assembly, wherein the first latch is operably coupled to a first handle to cause engagement or disengagement of the first latch.

9. The assembly of claim 8, wherein the table assembly is coupled to a second latch, which is configured to be engaged or disengaged to permit sliding of the table assembly, wherein the second latch is operably coupled to a second handle to cause engagement or disengagement of the second latch.

10. The assembly of claim 1, wherein the cabinet assembly includes a work surface assembly coupled to the outer frame, wherein the work surface assembly includes a first desk top and a second desk top, which is rotatable with respect to the first desk top between a compact position and an extended position.

11. The assembly of claim 10, wherein the second desk top is rotatable while the table assembly is in either the first position or the second position.

12. The assembly of claim 10, further comprising moveable supports arranged to support the second desk top when the second desk top is in the extended position.

13. The assembly of claim 1, wherein the panel is configured to rotate or slide to selectively cover or expose the second opening.

14. The assembly of claim 1, wherein the panel is a first panel, wherein the assembly includes a second panel that is moveable to selectively cover or expose a separate portion of the second opening.

15. The assembly of claim 1, wherein the table assembly is able to move between the first position and the second position when the panel is covering the second opening.

16. The assembly of claim 1, wherein the panel is a first panel, wherein the assembly includes a second panel that is moveable to selectively cover or expose the first opening.

17. The assembly of claim 1, further comprising a back section with a top surface defining a third opening that is slot-shaped, and a door moveable between an open position to expose the third opening and a closed position to cover the third opening.

18. The assembly of claim 1, wherein the table assembly does not include a leg such that the table assembly is cantilevered in the second position.

19. A recreational vehicle comprising:
 a dinette assembly comprising a cabinet assembly and a table assembly,
 the cabinet assembly including an outer frame and including a front section with a front face comprising a first opening and a second opening positioned below the first opening,
 the table assembly configured to (1) rotate within a plane between a first position and through the first opening to a second position and (2) slide along the cabinet assembly within the plane while the table assembly is in the second position, and
 a panel coupled to the cabinet assembly and moveable to selectively cover or expose the second opening.

20. The recreational vehicle of claim 19, wherein the dinette assembly is positioned on a slideout.

\* \* \* \* \*

UNITED STATES PATENT AND TRADEMARK OFFICE
CERTIFICATE OF CORRECTION

PATENT NO. : 11,701,990 B1
APPLICATION NO. : 17/694772
DATED : July 18, 2023
INVENTOR(S) : Kimberly Mann, Eric Michael Jones and Matthew Haugen It is certified that error appears in the above-identified patent and that said Letters Patent is hereby corrected as shown below:

In the Claims

Claim 1 beginning at Column 7, Line 38:
After "assembly", delete "having an outer frame; and a table assembly configured to (1) rotate within a plane between a first position and a second position and (2) slide along the cabinet assembly within the plane while the table assembly is in the second position", add "including an outer frame and including a front section with a front face comprising a first opening and a second opening positioned below the first opening; a table assembly configured to (1) rotate within a plane between a first position and through the first opening to a second position and (2) slide laterally along the cabinet assembly within the plane while the table assembly is in the second position; and a panel coupled to the cabinet assembly and moveable to selectively cover or expose the second opening".

Claim 19 beginning at Column 8, Line 57:
After "slide", add "laterally".

Signed and Sealed this
First Day of October, 2024

*Katherine Kelly Vidal*

Katherine Kelly Vidal
*Director of the United States Patent and Trademark Office*